United States Patent

Macrander et al.

[15] 3,687,307
[45] Aug. 29, 1972

[54] DEVICE FOR EMPTYING FLOATING CONTAINERS

[72] Inventors: Karl Macrander; Heinrich Kessel, both of Wilhelmshaven, Germany

[73] Assignee: Fried Krupp Gesellschaft mit beschrankter Haftung, Essen, Germany

[22] Filed: June 1, 1971

[21] Appl. No.: 148,509

[30] Foreign Application Priority Data

July 15, 1970 Germany..........P 20 34 991.1

[52] U.S. Cl....................................214/12, 214/313
[51] Int. Cl.................................................B65j 65/34
[58] Field of Search........214/12, 1 Q, 312, 313, 314, 214/52 C, 46.24, 46.32

[56] References Cited

UNITED STATES PATENTS

| | | | |
|---|---|---|---|
| 1,782,503 | 11/1930 | Ellson | 214/313 |
| 3,429,461 | 2/1969 | Fenchel | 214/12 |
| 3,537,600 | 11/1970 | Schuchmann | 214/12 |

Primary Examiner—Gerald M. Forlenza
Assistant Examiner—Frank E. Werner
Attorney—Walter Becker

[57] ABSTRACT

The specification discloses a device for engaging containers floating in the water and for moving the containers from the water to a discharge station and for tilting the containers to discharge the contents thereof into the discharge station. The arrangement comprises a carriage and an inclined track arrangement on which the carriage is moveable from beneath the water up to the discharge station. The carriage supports a tiltable cradle engagement with a container from beneath and on one side. Adjacent the discharge station is a frame which engages the container on the other side and which also operatively engages the cradle and which frame is caused to rotate in response to movement of the carriage for the discharge station. When the frame is engaged with the container and cradle the container and cradle are caused to rotate with the frame and thereby tilt the container and discharge the contents therefrom into the discharge station.

8 Claims, 8 Drawing Figures

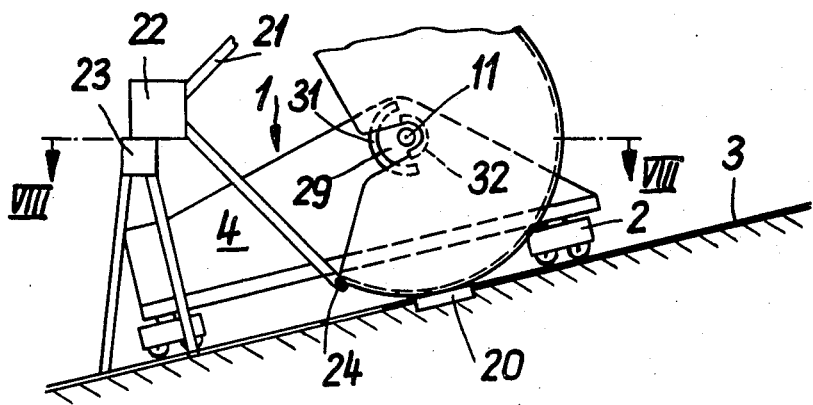
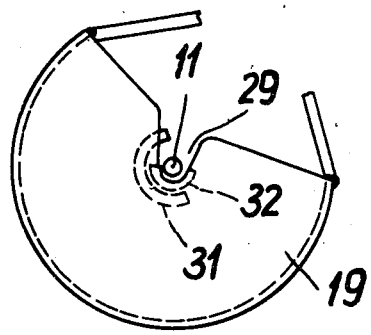
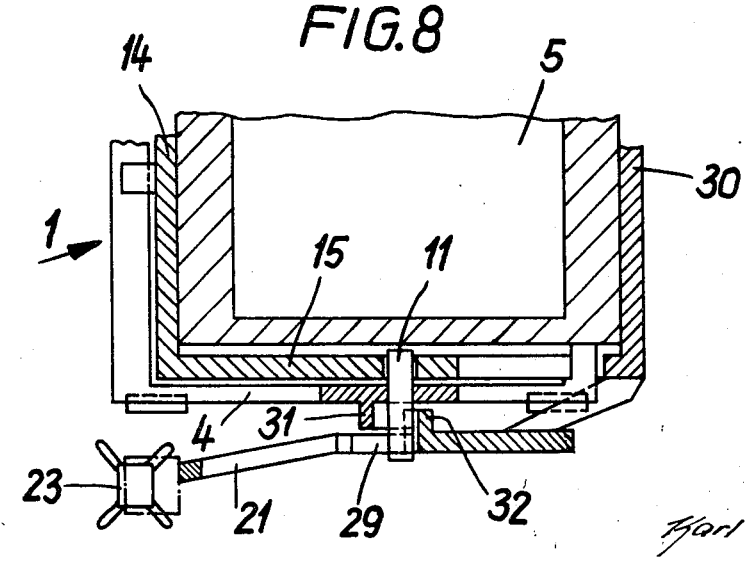

DEVICE FOR EMPTYING FLOATING CONTAINERS

The present invention relates to an apparatus or a device for emptying floating containers by means of a slip carriage which, first under water and on an inclined path, is moved upwardly and receives a floating container containing pourable goods in an arrangement transverse to the path, and is then moved out of the water to a discharge station. A corresponding device for emptying floating cargo pipes is described in German Pat. No. 1,035,055.

It is an object of the present invention so to design a device of the above referred to general character that the transloading of pourable goods from floating containers to the shore can be effected in a minimum of time and thus highly economically.

This object and other objects and advantages of the invention will appear more clearly from the following specification in connection with the accompanying drawings, in which:

FIGS. 1–5 respectively illustrate cross sections through the inclined path and also show side views of the remaining parts which pertain to the device for emptying floating containers according to the invention, while also showing an end view of a floating container during different phases of the emptying operation.

FIG. 6 illustrates on a larger scale than that of FIGS. 1–5 a portion of the device in the condition of FIG. 3.

FIG. 7 shows a portion of the device according to the invention during the emptying phase illustrated in FIG. 5, likewise on a larger scale than that of FIG. 5.

FIG. 8 represents a section taken along the line VIII—VIII of FIG. 6.

Figure 1:
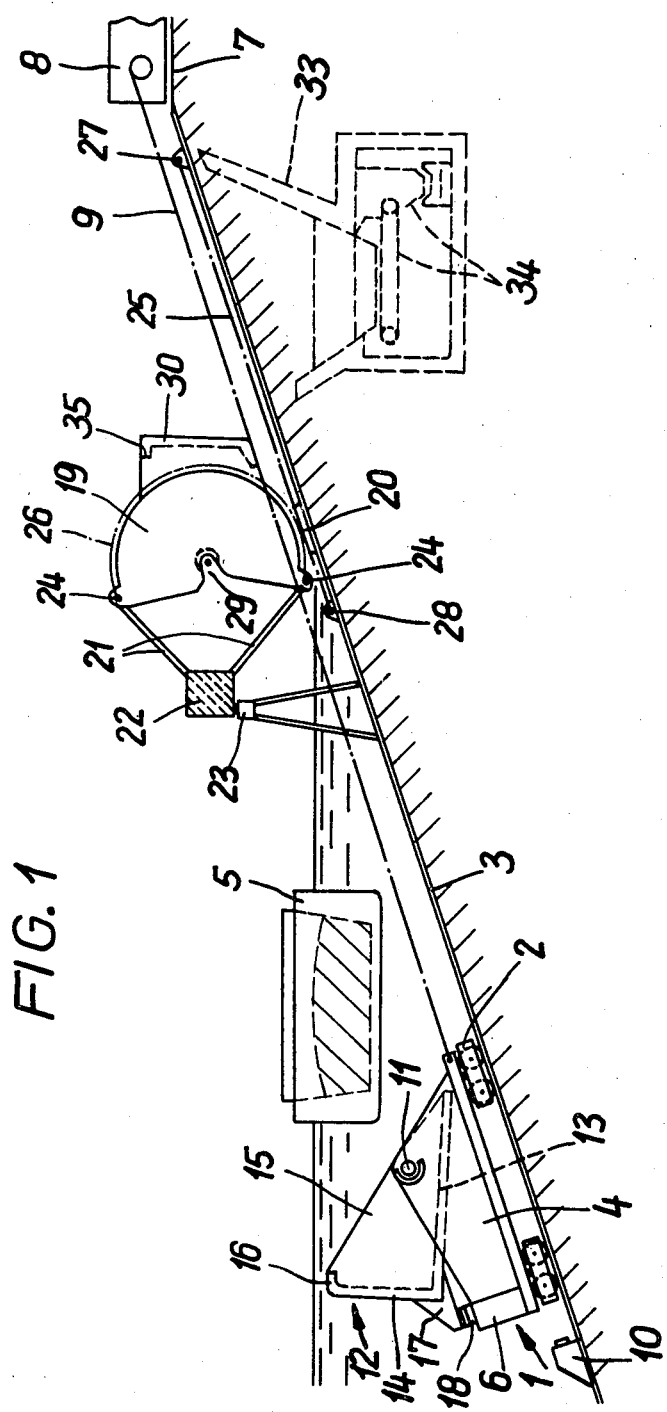

The device for emptying floating containers according to the invention is characterized primarily in that the slip carriage in bearings with an axis transverse to the moving direction carries a cradle which has a bottom serving as support for the floating container and also has a side wall pointing toward the water, which means away from the shore, for engagement with one side wall of the floating container but which is open toward the shore while the center of gravity of the cradle and of the floating container resting thereon is relative to the bearings offset in a direction away from the shore, and while a corresponding tilting of the cradle is prevented by an abutment of the carriage. The device according to the invention is furthermore characterized in that on both sides of that portion of the inclined path which is located above the water level there are, in a rolling manner, guided two rolling sectors of a receiving device starting from a lower end position in which during the upward movement of the slip carriage bearing pivots located on the cradle enter into central recesses of the rolling sectors, and that side wall of the floating container which is located on the shore side engages a side wall located on the rolling sectors, whereas during the further upward movement of the slip carriage the rolling sectors taken along by the carriage and automatically carrying out a rolling movement turn the carriage in such a way that the floating container will be emptied when being located in the upper region of the inclined path.

Referring now to the drawings in detail, the arrangement shown therein comprises a slip carriage 1 which at each end has a truck or bogie 2 by means of which it rolls on rails 3 forming an inclined track. This track extends in the manner of a ramp partially under the water and partially above the water. The bogie of the slip carriage has two side walls 4 which are spaced from each other by a distance that is greater than the length of a floating container 5 which latter has, for instance, a length of 19 meters and a width of 9.5 meters and is adapted to load, for instance, 400 tons of pourable goods. The two side walls 4 are on that side which faces away from the shore connected to each other by a strong wall 6 but are not connected to each other in the direction toward the shore.

On a berm 7 at the upper end of the inclined track there are mounted two winches 8 so that the cables 9 from the two winch drums can be guided approximately parallel to the rails 3 to the end faces of the slip carriage 1 where they are connected to the bogie or truck. Care has been taken that the cables 8 are driven synchronously. At the lower end of each rail 3 there is provided a buffer stop 10.

Bearing bolts 11 are located in the side walls 4 of the slip carriage and have a common horizontal axis extending transverse to the driving direction of the carriage. These bolts 11 extend one hand from the side walls 4 inwardly and serve for journalling a cradle 12 with a bottom 13, a side wall 14 and two walls 15. The side wall 14 is located on that side which in FIGS. 1 and 2 faces away from the shore. The two walls 15 extend from the upper edge of the side wall 14 to the edge of the bottom 13 which is adjacent the shore. The cradle 12 furthermore comprises bearings for the bearing bolts 11. The cradle 12 is thus open toward the shore.

Figure 2:
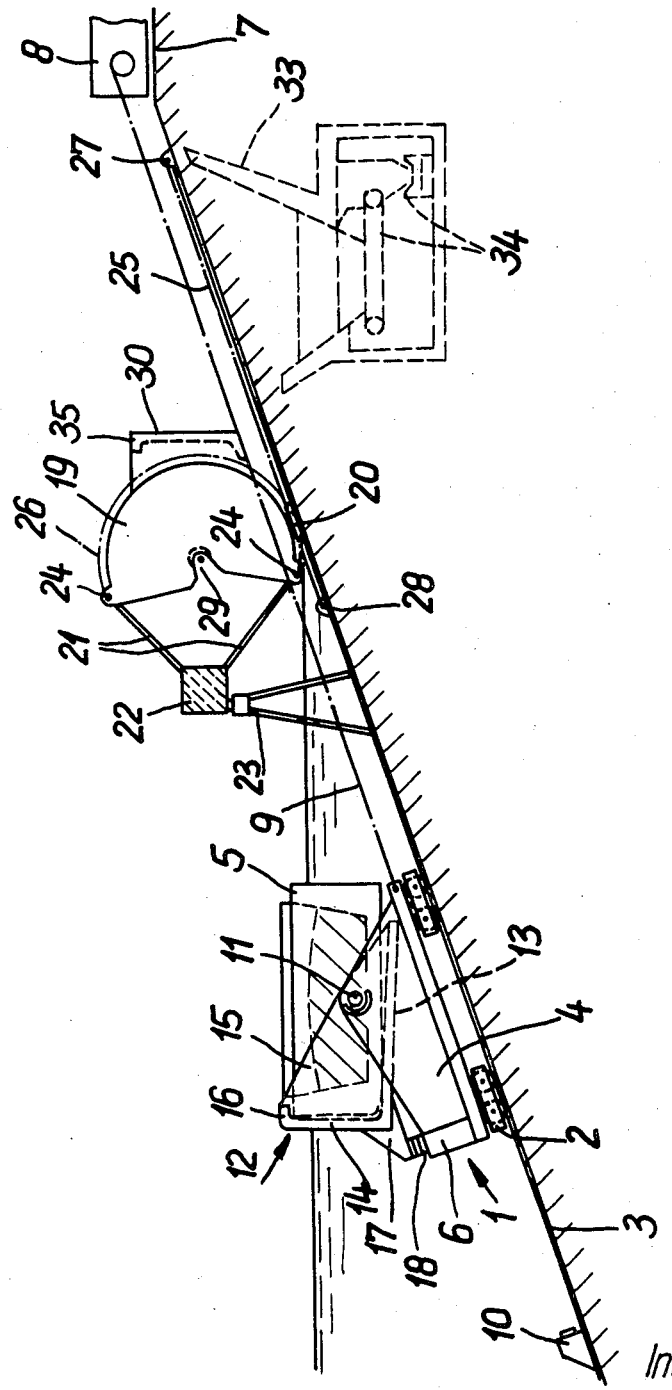

FIG. 1 shows the slip carriage nearly at the lower end of the inclined path or track 3, immersed below the water. Above the carriage 1 and in front thereof there is shown the floating container 5 floating in the water. When the slip carriage 1 is by means of the winches 8 moved upwardly, the cradle 12 eventually picks up the container 5. In this condition, the bottom 13 of the cradle engages the bottom of the floating container, and the side wall 14 engages that side wall of the floating container which faces away from the shore. The side wall 14 of the cradle has its upper edge provided with a strip or edge 16 which will extend over the adjacent side walls of the floating container. The bearings for the bearing bolts 11 are arranged in the walls 15 so that the center of gravity of the cradle 12 and of the floating container resting thereon will be offset with regard to the axis of the bearing bolts 11 in a direction away from the shore. Consequently, the cradle 12 with the container 5 will have the tendency to tilt in counter-clockwise direction with regard to FIG. 1. The cradle 12, however, is prevented from such tilting movement in view of the fact that one arm 17 rests against an abutment 18 on wall 6. As a result thereof, the position of the floating container on the slip carriage 1 will be secured. FIG. 2 shows how the slip carriage 1 picks up the floating container 5.

Approximately in the center of the inclined path or track outside the water, there is provided a receiving device for the floating container moved out of the water by the slip carriage 1.

This receiving device has two rolling sectors 19 the circumference of which follows a circle extending over more than 180°. These rolling sectors 19 will in the starting position according to FIGS. 1–3, 6 and 8 rest with a part of their circumferential surfaces on supports 20 which are arranged adjacent the rails 3 in such a way that the rails are located therebetween. The circumferential surfaces are facing the winches 8. Connected to the ends of the circumferential surface of each rolling sector 19 are struts 21 by means of which a counter weight 22 is connected to each of the rolling sectors. The arrangement is such that the center of gravity of the rolling sectors with all parts arranged thereon is at least approximately located along the central line of the rolling sectors. This line extends horizontally and transverse to the direction of movement of the slip carriage. In the starting position according to FIGS. 1–3, 6 and 8, the counter weights 22 face toward the water and rest on supports 23 which are so located adjacent the rails 3 that they are arranged therebetween. The rolling sectors will in this way be prevented from rolling downwardly from their starting position.

Positive rolling movements of the rolling sectors 19 along the inclined track 3 are obtained by the fact that cables 25, 26 have one end each connected to the two end points 24 of the circumferential surface of the rolling sectors while the other ends of the cables 25, 26 are in the vicinity of the berms 7, 28 connected to points in the vicinity of the support 23, the cables 25, 26 resting more or less against the circumferential surface of the rolling sectors depending on the position of the rolling sectors. Each rolling sector 19 has that side thereof which faces the counter weight 22 provided with a recess 29 with a rounded portion the central line of which coincides with the central line of the circumferential surface of the rolling sector, the recess 29 being open toward the water when the rolling sectors 19 occupy their starting position of FIGS. 1–3, 6 and 8.

Figure 3:
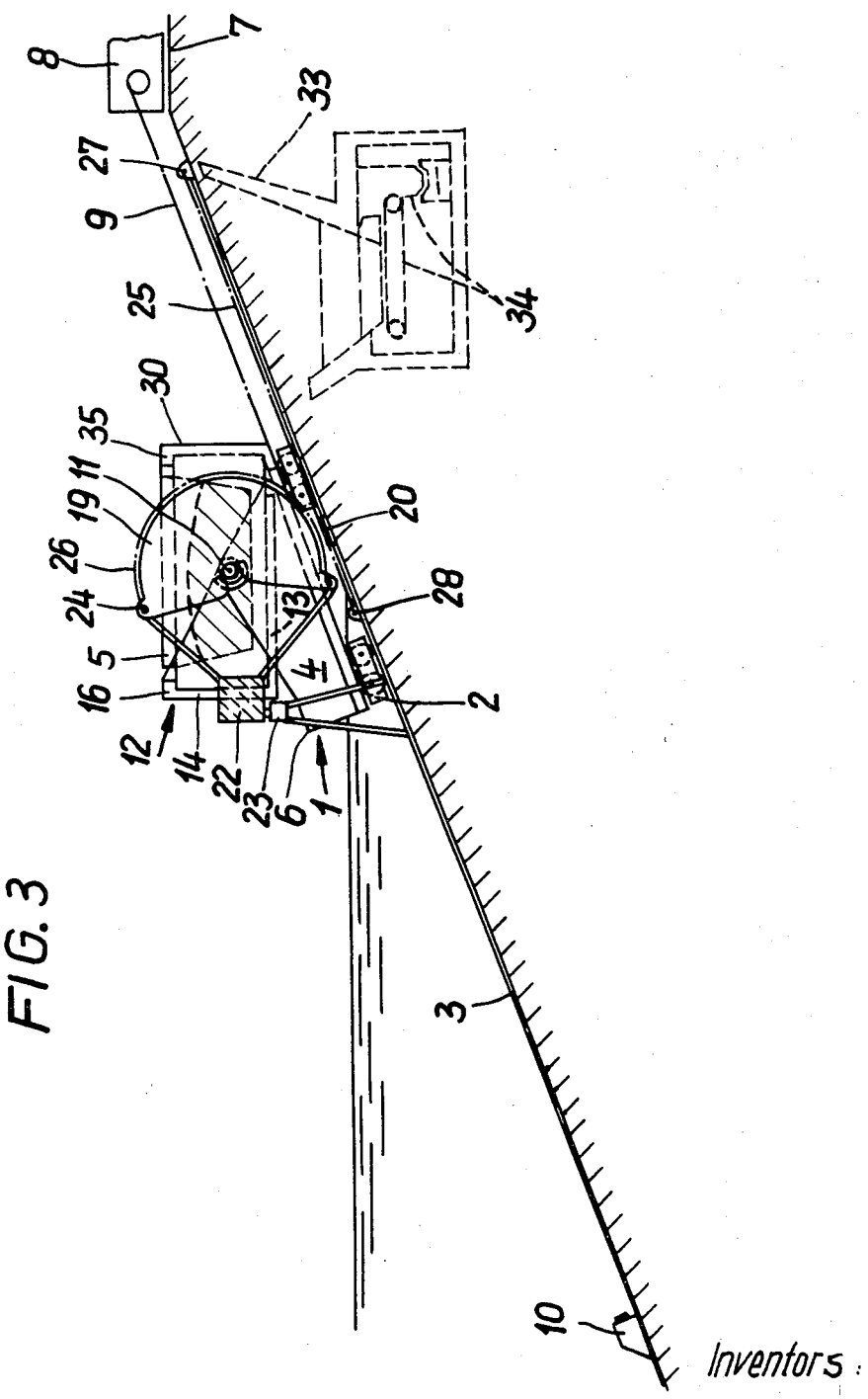

As will be evident from FIG. 3, when the slip carriage 1 with the floating container resting thereon during the upward movement of the carriage has passed between the supports 23 and the two rolling sectors 19, the bearing bolts 11 have their ends which are spaced from the walls 4 centrally engage the recesses 29. The cradle 12 will on that side thereof, which was up to this point the open side, be supplemented by a side wall 30 which in a corresponding arrangement is mounted on the rolling sectors 19 on that side thereof which faces away from the counter weights 22.

As will be clearly evident from FIGS. 6, 7 and 8, a cup 31 in the form of half a hollow cylinder is arranged on the outside of each wall 4 of the slip carriage. The central line of the hollow cylinder coincides with the central line of the joint bolt or pin 11. The half cylinder is open that side thereof which faces toward the winch 8. Its inner radius is considerably larger than the radius of bolt 11.

Mounted on each rolling sector 19 and on he inner side thereof is a cup 32 which has the shape of half a cylinder. This last mentioned cylinder is coaxially arranged with regard to the rolling sectors and thus also to the recess 29, and similar to the latter is in the starting position of the rolling sectors open toward the water. The outer and inner radius of the cup 33 is so selected that the cup is able to enter the annular space between the cup 31 and the pin 11.

Figure 4:
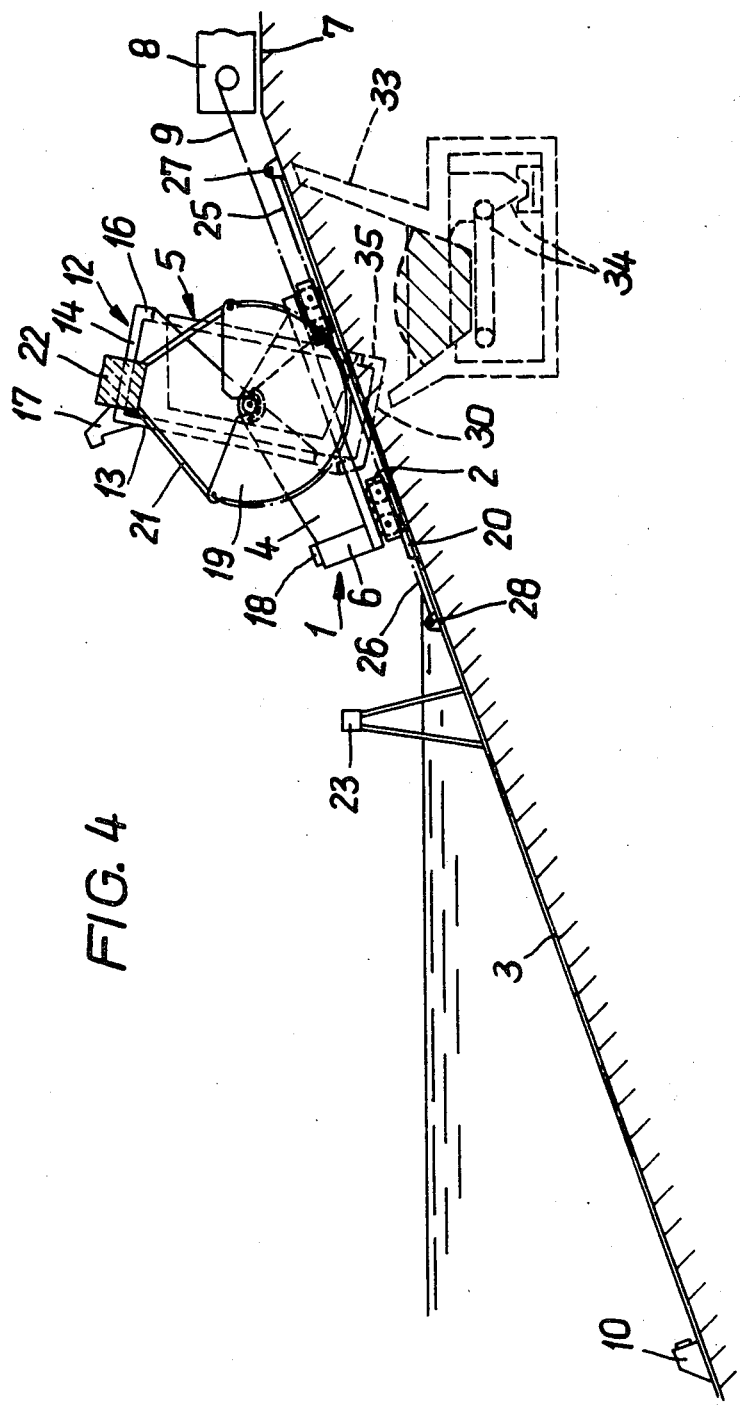

When the slip carriage 1 and the rolling sectors 19 occupy their FIGS. 3, 6 and 8 positions, the two cups 31 and 32 have their openings located opposite to each other while their central lines coincide with the central lines of the bolts or pins 11. When the slip carriage 1 is pulled out of this position by means of the winches 8 so that it moves on rails 3 further in upward direction, the carriage 1 will by means of the joint bolts 11 take along the rolling sectors 19 which latter in view of the cables 25, 26 will carry out rolling movements. The rotation of the rolling sectors 19 inherent thereto is also conveyed to the cradle 12 and the floating container located thereon inasmuch as the side wall 30 mounted on the rolling sectors 19 has established connection with the cradle 12. As a result thereof, the floating container 5 is tilted so that the pourable goods will pour into a funnel 33 which is arranged in the ground between the rails 3 in the vicinity of and below the berm 7, and below which funnel there is provided a conveyor 34. FIG. 4 illustrates how the floating container 5, shortly before the slip carriage has reached its uppermost end position on the track is tilted into a steep position so that the pourable goods will pour out of the container and into the funnel 33. According to FIG. 5, the floating container 5 is, when the carriage has reached its uppermost position, tilted still further so that also the last remaining portions of the pourable material or goods will be discharged from the container 5.

Figure 5:
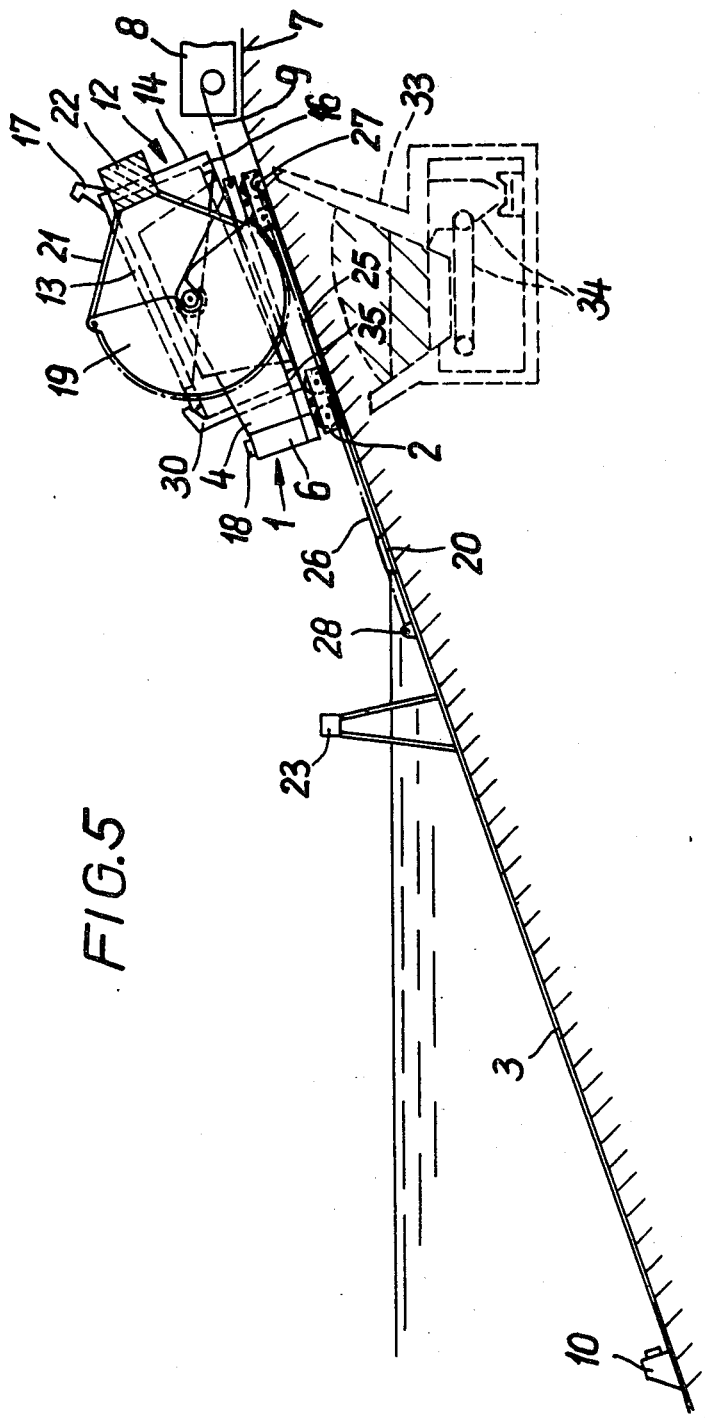

When in this manner the rolling sectors turn in conformity with their rolling movement, the cups 32 mounted thereon enter the annular gap between the cups 31 on the walls 4 of the slip carriage and the joint bolts 11 as illustrated in FIG. 7 for the position of FIG. 5. Consequently, the rolling sectors 19 are through the intervention of cups 31 supported by the walls 4 of the slip carriage. Therefore, it is not necessary that the rolling sectors rest by means of their circumferential surfaces on rolling paths adjacent rails 3.

After the floating container 5 has been emptied, the slip carriage 1 is by means of the cable winches 8 allowed to move downwardly on rails 3 followed by the rolling sectors 19 which in view of the cables 25, 26 automatically carry out rolling movements until the counter weights 12 rest upon the supports 23. During the further downward movement of the slip carriage 1 with the empty floating container thereon, the joint bolts 11 leave the recesses 29 of the rolling sectors 19. When during the further downward movement of the slip carriage the container reaches the water and is supported thereby, the cradle 12 will during the final downward movement of the carriage 1 disengage the container.

During the tilting movement of the floating container 5 in conformity with FIGS. 4 and 5, the strip or latch 16 on the side walls 14 of the cradle and the strip or latch 35 on the side wall 30 supported by the rolling sectors 19 prevent the floating container from dropping out of the cradle.

The movement of the floating container 5 into the region of the slip carriage 1, and the transport of the emptied floating container from this region is effected by means of tug boats.

As will be evident from the above, the present invention brings about the advantage that floating containers having, for instance, a length of 19 meters and a width of 9.5 meters with a loading capacity of 400 tons of pourable material do no longer have to be emptied by grab cranes and to this end have no longer to be moored to a quay or pier but can be emptied instantaneously on land in the manner of round bottom rotary dump cars after the containers have in a simple manner be moved out of the water to the dumping station. In this way the time for emptying a floating container is considerably reduced. This is aided by the fact that the tilting of the floating container is effected automatically by means of the rolling sectors in view of the upward movement of the slip carriage onto the upper part of the inclined track so that it is not necessary after the arrival of the slip carriage at the upper end of the track to actuate a tilting device.

It is, of course, to be understood that the present invention is, by no means, limited to the particular showing in the drawings but also comprises any modifications within the scope of the appended claims.

What is claimed is:

1. In a device for emptying a container from which the contents can be discharged by tilting the container and which container is floatable in water; a slip carriage moveable along an inclined path extending from beneath the water in which the container is floating upwardly to a discharge station above he water, a cradle, supporting pivot shafts on the ends of said cradle engaging said carriage for tilting of the cradle about a tilt axis transverse to said path, said cradle having a bottom wall engageable with a floating container from beneath and a side wall on the side facing away from said discharge station and open on the other side, said tilt axis being on the discharge station side of the center of gravity of said cradle and a container thereon, a frame along said path adjacent said discharge station on the side toward the water and rotatable on a rotation axis parallel to said tilt axis and at the same elevation from said path as said tilt axis, recess means in the frame on said rotation axis operable to receive said pivot shafts when the carriage is moved toward said discharge station, and means operable upon further movement of said carriage toward said discharge station after said pivot shafts engage said recess means to cause rotation of said frame on said rotation axis, and means on said cradle and frame engageable with a container in the cradle operable to cause said container and cradle to rotate with said frame thereby to empty said container into said discharge station.

2. A device according to claim 1 which includes cooperating elements of abutment means on said cradle and carriage to stop said cradle when tilted in said carriage by gravity in such a position that the bottom wall of the cradle is substantially horizontal.

3. A device according to claim 1 in which said frame has a side wall opposed to said side wall of said cradle and said means engageable with said container comprises projections on said side walls engageable over the top of a said container in said cradle.

4. A device according to claim 1 in which said frame is counterweighted so as to be stable in the position in which the cradle is introduced into the frame, and abutment means on said frame and on a stationary point to stop said frame in cradle receiving position.

5. A device according to claim 1 in which said frame has circular sectors fixed thereto at the opposite ends outside the range of said carriage, supports on which the sectors rollingly rest, and cables stationarily anchored at one end and leading in opposite directions parallel to said path from the said one end to the bottom of said sectors and at least part way around the sectors and connected thereto whereby translation of said frame along said path will cause rotation of said sectors and frame.

6. A device according to claim 1 in which said carriage includes side walls in which said pivot shafts are journaled and from which said pivot shafts project outwardly for engagement in the said recesses of said frame, first arcuate projections on the outsides of said side walls concentric with and radially spaced from said pivot shafts, said frame also having side walls disposed immediately outwardly of the paths of the side walls of said carriage and in which said recesses are formed, and second arcuate projections on the insides of the side walls of said frame coaxial with said rotation axis and receivable inside said first projections for rotatably supporting said frame on said carriage as said frame rotates during movement of said carriage.

7. A device according to claim 6 in which said side walls of said frame are in the form of circular segments, and means engaging said circular segments and operable to cause rotation of said frame when the frame moves along said path with said carriage.

8. A device according to claim 7 in which said means engaging said circular segments comprise cable means attached to the segments at a point on the periphery thereof and leading about the segments and then in opposite directions from the bottom thereof parallel to said path to stationary anchor points.

* * * * *